June 24, 1924.
J. PUCIATO
FOOD CARRIER
Filed July 23, 1923    2 Sheets-Sheet 1
1,499,077
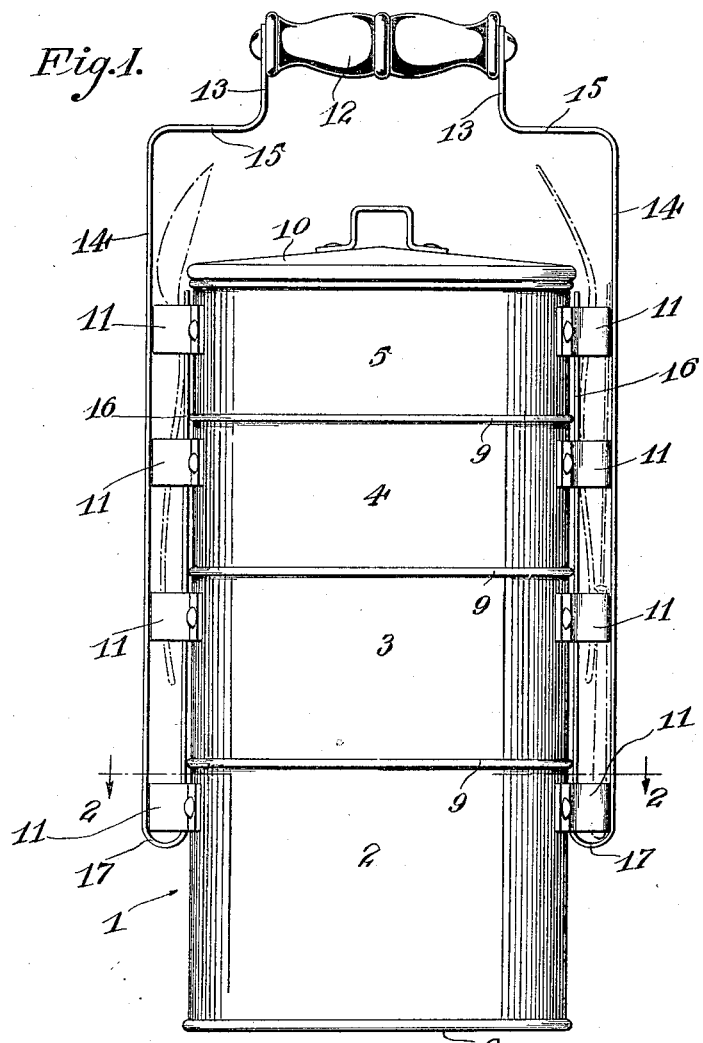
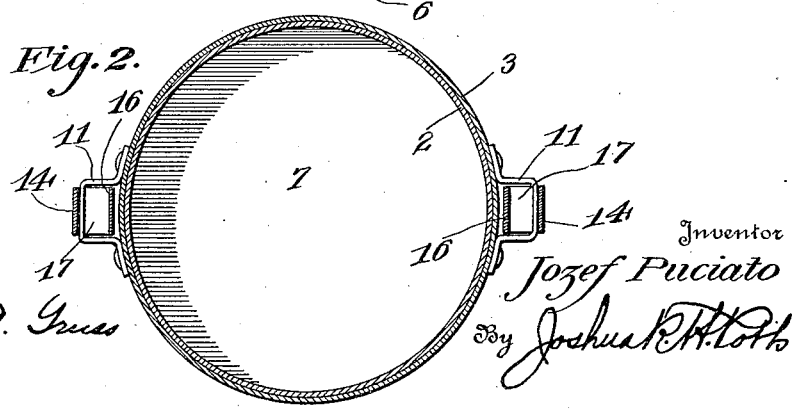

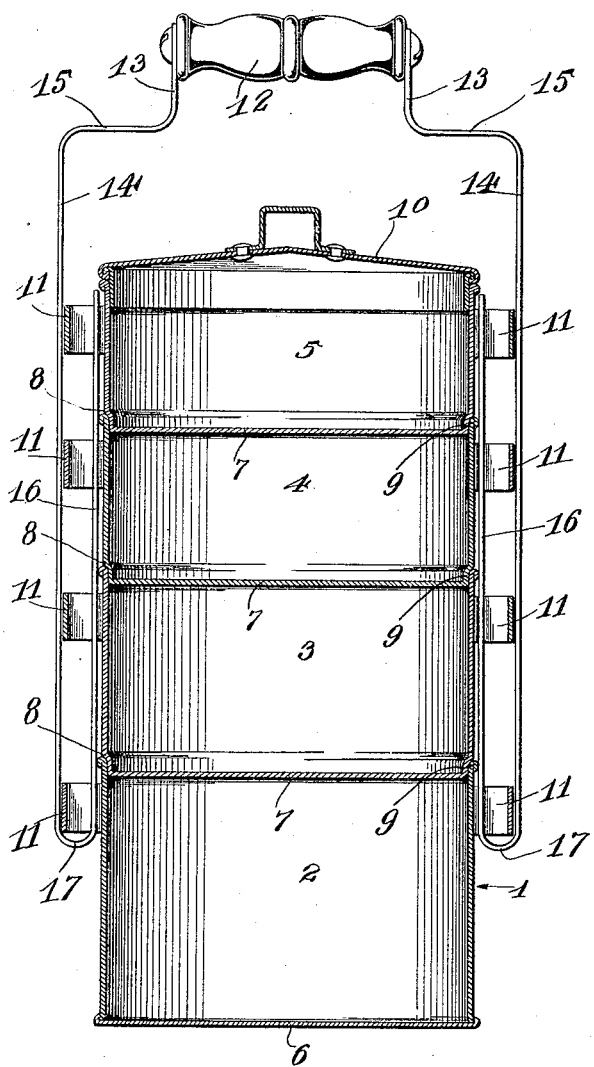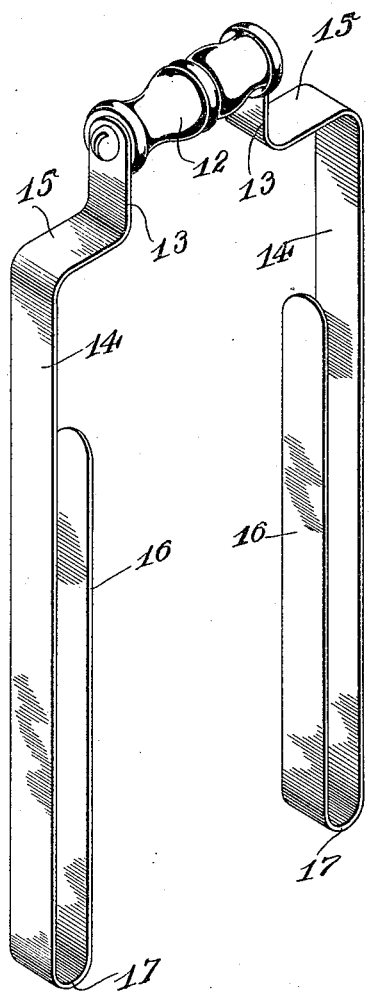

Patented June 24, 1924.

1,499,077

UNITED STATES PATENT OFFICE.

JOZEF PUCIATO, OF PHILADELPHIA, PENNSYLVANIA, ASSIGNOR OF ONE-HALF TO JOHN PLOHARSKI, OF PHILADELPHIA, PENNSYLVANIA.

FOOD CARRIER.

Application filed July 23, 1923. Serial No. 653,092.

*To all whom it may concern:*

Be it known that I, JOZEF PUCIATO, a citizen of the United States, residing at Philadelphia, in the county of Philadelphia and State of Pennsylvania, have invented certain new and useful Improvements in Food Carriers, of which the following is a specification.

My invention relates to food carriers which are particularly adapted for use in carrying food to work, picnics, camps and the like.

The objects are to provide a food carrier which will include a plurality of superposed receptacles for different foods, and means for carrying the receptacle which will hold knives, forks, spoons and like articles.

These objects, and other advantageous ends which will be described hereinafter, I attain in the following manner, reference being had to the accompanying drawings in which—

Figure 1 is a side elevation of a food carrier constructed in accordance with my invention, Figure 2 a section on line 2—2 of Figure 1, Figure 3 a central section through the food carrier shown in Figure 1, certain parts being shown in full, and Figure 4 a perspective view of the carrying means constructed in accordance with my invention.

Referring to the drawings, 1 indicates a food carrier which consists of superposed receptacles 2, 3, 4 and 5. The receptacle 2 is provided with any suitable plain bottom 6 while the receptacles 3, 4 and 5 are provided with a bottom 7 slightly smaller than the body of the receptacle so that each bottom will fit within the lower adjacent receptacle and provide a shoulder 8 which rests on a beaded edge 9 at the top of the lower adjacent receptacle. The top receptacle 5 is provided with a lid 10 of any suitable type. Rectangular eyes 11 are provided on the opposite sides of each receptacle in the form of strips bent to form a rectangular opening and riveted or otherwise secured to the receptacles. The carrying means is composed of a handle 12 secured to U-shaped strips 13 having one leg 14 long and shaped to provide an outwardly bent part 15. The other leg 16 is short and passes through eyes 11 on the receptacles.

To place food in my improved carrier the upper receptacles are lifted off the lower adjacent receptacles so that the eyes will slide off the short legs 16 of the carrying means. The food is placed in the receptacles and the receptacles replaced one on the other by sliding the eyes 11 over the short legs 16. The eating utensils, such as knives, forks and spoons, are slipped through the eyes so that they will be disposed between the legs. The bottom 17 of the U-shaped strips forms a stop on which the utensils rest, and prevents them from slipping downward out of the eyes.

A food carrier constructed as above described will carry different kinds of foods without mixing or spilling them; will carry the eating utensils and may be cheaply made.

While I have described my invention as taking a particular form, it will be understood that the various parts may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:—

1. A food carrier including superposed receptacles; eyes at opposite sides of the receptacles disposed in vertical alignment; U-shaped strips having one leg passing upwardly through the eyes and disposed to provide a space between it and the outer part of the eyes for receiving eating utensils and the other leg passing upwardly outside the eyes, and a handle secured to the outer legs.

2. A food carrier including receptacles; rectangular eyes at opposite sides of each receptacle disposed in vertical alignment; U-shaped strips having one leg passing upwardly through the eyes and disposed to provide a space between it and the outer part of the eyes for receiving eating utensils and the other leg passing upwardly outside the eyes, the portion connecting the lower ends of the legs forming a stop for the utensils below the lowermost eye, and a handle secured to the outer legs.

In testimony whereof I have signed my name to this specification in the presence of two subscribing witnesses.

JOZEF PUCIATO.

Witnesses:
    CHAS. E. POTTS,
    ELIZABETH GARBE.